United States Patent
Kanarat (10) Patent No.: US 7,286,692 B2
(45) Date of Patent: Oct. 23, 2007

(54) AUTOMATIC CELEBRITY FACE MATCHING AND ATTRACTIVENESS RATING MACHINE

(76) Inventor: Amnart Kanarat, 915 University City Blvd., Apt. C11, Blacksburg, VA (US) 24060

( * ) Notice: Subject to any disclaimer, the term of this patent is extended or adjusted under 35 U.S.C. 154(b) by 649 days.

(21) Appl. No.: 10/329,653

(22) Filed: Dec. 26, 2002

(65) Prior Publication Data

US 2003/0130035 A1    Jul. 10, 2003

Related U.S. Application Data

(60) Provisional application No. 60/342,346, filed on Dec. 27, 2001.

(51) Int. Cl.
*G06K 9/00* (2006.01)

(52) U.S. Cl. ............... 382/118; 382/209; 382/224; 463/19; 463/43

(58) Field of Classification Search ............... 382/118, 382/218, 209, 224; 396/2; 707/104.1; 715/707; 463/19, 43
See application file for complete search history.

(56) References Cited

U.S. PATENT DOCUMENTS

| | | | | |
|---|---|---|---|---|
| 5,288,075 A * | 2/1994 | Kelley | ...... | 273/243 |
| 5,375,195 A * | 12/1994 | Johnston | ...... | 345/630 |
| 5,781,650 A * | 7/1998 | Lobo et al. | ...... | 382/118 |
| 5,850,470 A * | 12/1998 | Kung et al. | ...... | 382/157 |
| 5,982,912 A * | 11/1999 | Fukui et al. | ...... | 382/118 |
| 6,108,437 A * | 8/2000 | Lin | ...... | 382/118 |
| 6,142,876 A * | 11/2000 | Cumbers | ...... | 463/25 |
| 6,148,148 A | 11/2000 | Wain et al. | | |
| 6,181,806 B1 * | 1/2001 | Kado et al. | ...... | 382/118 |
| 6,229,904 B1 | 5/2001 | Huang et al. | | |
| 6,234,900 B1 * | 5/2001 | Cumbers | ...... | 463/29 |
| 6,400,652 B1 * | 6/2002 | Goldberg et al. | ...... | 369/7 |
| 6,751,340 B2 * | 6/2004 | Prokoski | ...... | 382/118 |
| 6,879,709 B2 * | 4/2005 | Tian et al. | ...... | 382/118 |
| 6,882,741 B2 * | 4/2005 | Dobashi et al. | ...... | 382/118 |
| 6,931,147 B2 * | 8/2005 | Colmenarez et al. | ...... | 382/118 |
| 7,020,345 B2 * | 3/2006 | Tsai et al. | ...... | 382/274 |
| 7,050,608 B2 * | 5/2006 | Dobashi | ...... | 382/118 |
| 7,062,073 B1 * | 6/2006 | Tumey et al. | ...... | 382/118 |
| 2004/0152512 A1 * | 8/2004 | Collodi et al. | ...... | 463/30 |
| 2006/0251292 A1 * | 11/2006 | Gokturk et al. | ...... | 382/103 |

OTHER PUBLICATIONS

Brunelli and Poggio, Face Recognition: Features versus Templates, IEEE Transactions on Pattern Analysis and Machine Intelligence, vol. 15, No. 10, Oct. 1993.

* cited by examiner

*Primary Examiner*—Gregory M Desire
(74) *Attorney, Agent, or Firm*—Robert P. Michal; Frishauf, Holtz, Goodman & Chick, P.C.

(57) ABSTRACT

The present invention teaches an amusement machine having the abilities of automatically finding the most likely match of a user facial image to a prestored database of facial images such as celebrity images and in estimating the degree of attractiveness of the user facial image. The amusement machine has a camera 11 for taking a facial image of the user, automatically compares it to said prestored database of facial images, and assigns the attractiveness score. The results are then displayed to the user on a computer screen 13.

2 Claims, 7 Drawing Sheets

AUTOMATIC CELEBRITY FACE MATCHING AND ATTRACTIVENESS RATING MACHINE

Cross-Reference to Related Application

This application is entitled to the benefit of Provisional Patent Application Ser. No. 60/342,346 filed Dec. 27, 2001.

BACKGROUND

1. Field of Invention

This invention relates to an amusement machine, specifically to such amusement machine which is capable of finding a most likely matching of a user facial image in a data base of celebrity facial images and rating the degree of attractiveness of a user from his/her facial image.

2. Description of Prior Art

Nowadays, in the computer technology era, a lot of computerized entertainment machines are receiving a lot of attentions from many people. As we can see that there are increasing numbers of amusement machines such as arcade games, sticker kiosks, or automatic photography booths available in many public places like theme parks and shopping malls. These machines serve the need of a user in providing amusement to the user. However, people normally get bored very quickly with these amusement machines, so they constantly look for a new kind of entertainment, especially a bizarre one. The present invention aims to offer users with a unique kind of entertainment which has never been introduced before.

At the present time, all of the inventions relate to the field of amusement machines involving the manipulation of user facial images are found in the form of automatic photograph booths, for example, U.S. Pat. No. 6,148,148 (2000) and U.S. Pat. No. 6,229,904 (2001). The operation of these booths typically involves users sitting or standing in front of a digital/analog camera to have their images taken. The images are manually or automatically manipulated to modify image attributes such as background/foreground or to blend multiple images together. The manipulated images are developed and then dispensed to the users. However, none of these conventional automatic photograph booths has the capability of analyzing facial images and matching them against the facial images stored in a database as the present invention does.

Moreover, none of the amusement machines in the prior art has the ability to assign an approximate quantitative value to a qualitative attribute, such as the attractiveness of a person face, as the present invention does.

SUMMARY

In accordance with the present invention a machine comprises a computer, a camera, a computer screen, a track ball, a select button, a lighting means, a coin/bill receptor, audio speakers, a background curtain, a method of facial image matching, and a method of attractiveness rating.

The machine, an automatic celebrity face matching and attractiveness rating machine, automatically analyzes a facial image of the individual, and compares it to a collection of the celebrity facial images previously stored in the machine's computer to identify which celebrity most closely resembles the individual. Furthermore, the facial image is analyzed to establish a measure of the attractiveness of the individual. Both the matching result and the attractiveness score are reported to the individual.

OBJECTS AND ADVANTAGES

This invention aims to offer users a new kind of entertainment by providing answers to some trivial questions that a curious individual might have. Ones might wonder which celebrity they look like or how good they look. Here, the present invention is created to answer these two trivial questions to an individual in an interesting and humorous fashion.

Accordingly, several objects and advantages of the present invention are:

(a) to provide a machine which is mainly used for amusement purpose.

(b) to provide an amusement machine which can report to an individual which celebrity the individual looks like the most.

(c) to provide an amusement machine which can report to an individual approximately how much attractiveness the individual is.

(d) to provide a method in assigning an approximate quantitative value to a qualitative attribute such as the attractiveness of a person face.

(e) to provide such amusement machine which can be used to generate income.

Further objects and advantages of the present invention will become apparent from a consideration of the ensuing description and drawings.

REFERENCE NUMERALS IN DRAWINGS

| | |
|---|---|
| 11 camera | 12 lighting means |
| 13 computer screen | 14 small speaker |
| 15 track ball | 16 select button |
| 17 coin/bill receptor | 18 background curtain |
| 19 main speaker | 20 computer |
| 21 base section | 22 neck section |
| 23 head section | 24 cooling fan |
| 25 base section lid | 26 power cord |
| 27 power cord entry | 28 curtain controller |

DESCRIPTION

Figure 1:
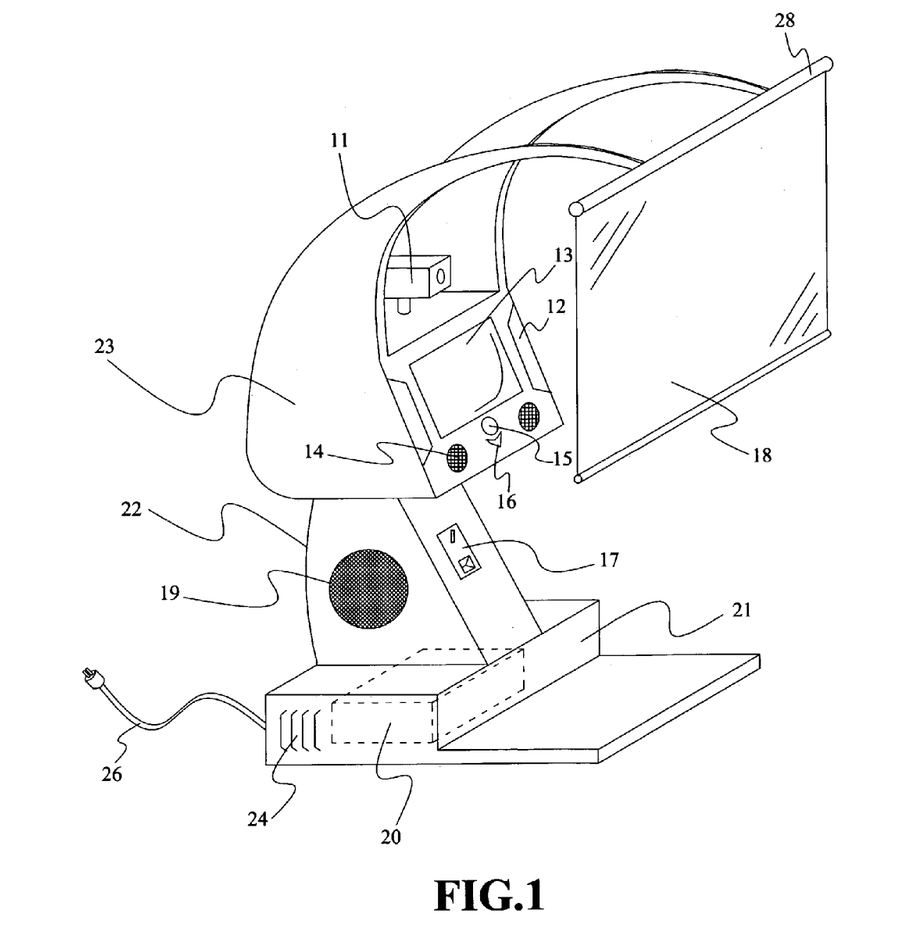
FIG. 1 is a diagrammatic perspective view of one form of a machine according to the invention.

A preferred embodiment of the machine of the present invention is illustrated in FIG. 1. FIG. 1 is an isometric view of one form of the machine constructed in accordance with the invention. The machine is in the form of a floor-standing type, and comprises a base section 21, a neck section 22, a head section 23, and a curtain controller 28. The base section 21, made of painted wood board or metal sheet, has a flat portion in the front to serve as a designated area for a person to stand on. A cooling fan 24 is installed on one side of the base section 21 to provide enough ventilation within the base section 21 to prevent a computer 20 mounted inside the base section 21 from overheating. A power cord 26 comes out from the back of the base section 21. Its function is to provide enough electricity needed by the machine. The computer 20 is a Personal Computer with at least one Gigahertz Microprocessor and at least 128 Megabytes of Random-Access Memory (RAM). The operating system of the computer 20 can be any operating system, preferably either WINDOWS or LINUX.

The neck section 22, which is also made of painted wood board or metal sheet, has a main speaker 19, with a built-in audio amplifier, on each side of the neck section 22. The main speaker 19 is an outdoor-type audio speaker, which is waterproof. The neck section 22 also has a coin/bill receptor 17 located in the front. The coin/bill receptor 17 functions like a standard coin/bill receptor, which can sense how much money a user put in and dispense changes back to the user if the amount of money the user put in over the programmed limit. The coin/bill receptor 17 has a key lock and can be accessed by only authorized persons.

The head section 23, which is also made of painted wood board or metal sheet, contains a computer screen 13, a lighting means 12, a track ball 15, a select button 16, and two small speakers 14. A camera 11 is mounted on top of the head section 23, and its field of view covers the whole area of a background curtain 18, which can be manually pulled down by a user or automatically dropped by the curtain controller 28. The color of the background curtain 18 is a solid color, most preferably a dark tone color such as blue or green. The background curtain 18 can be made of cloth or plastic. The curtain controller 28 controls the elevation of the background curtain 18 according to a command from the computer 20.

Figure 2:
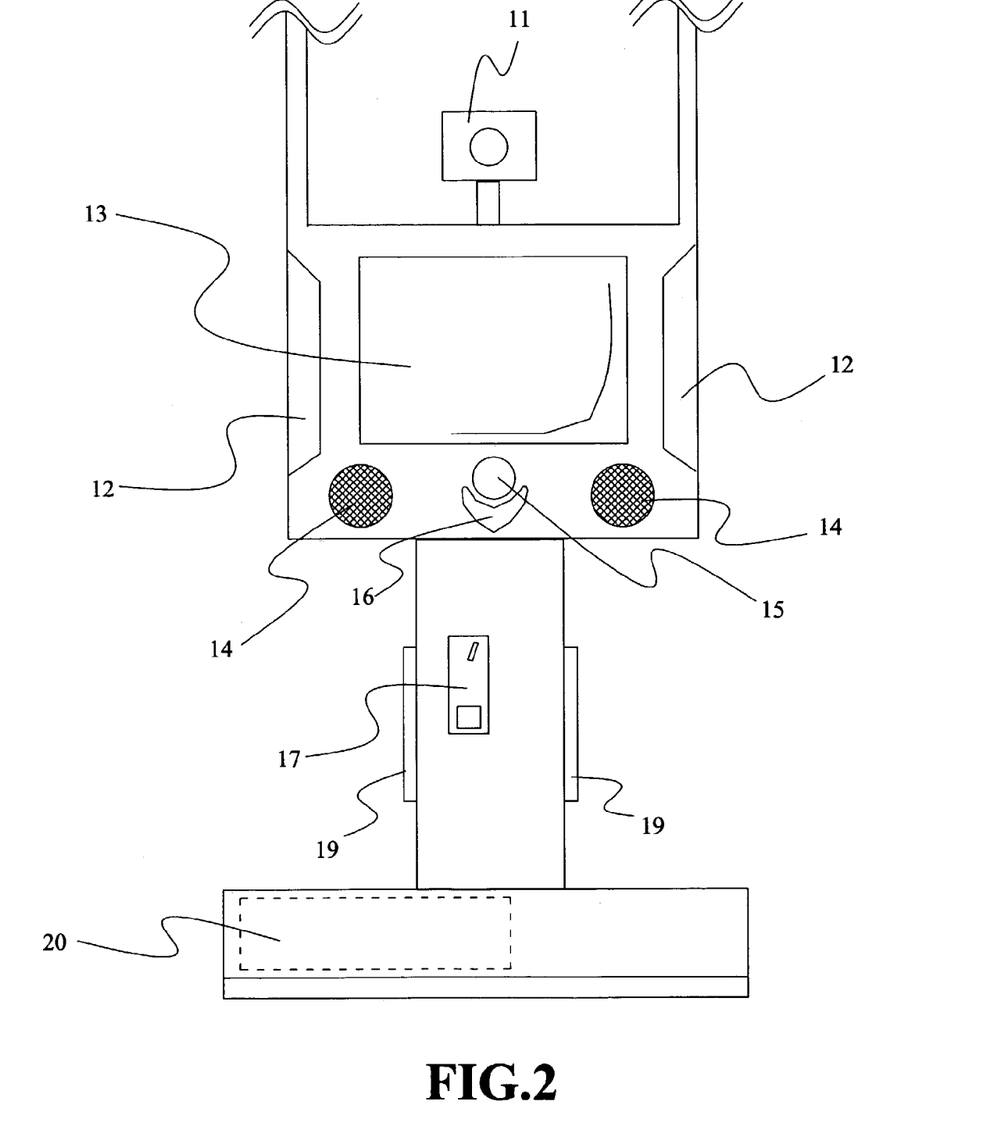
FIG. 2 shows a front view of the machine.

FIG. 2 shows a front view of the machine that the user will see when standing on the designated area between the camera 11 and the background curtain 18. The camera 11 is a standard fixed/auto-focus charge-coupled device (CCD) camera or a digital video camera with resolution at least 640 by 480 pixels, and can be either color or monochrome camera. A regular analog video camera can also be used; however, a frame grabber must be installed in the computer 20 to digitize a single frame of video into a digitized frame. The computer screen 13 can be a regular color computer monitor or a color computer LCD screen. Beside the computer screen 13 are located the lighting means 12, most preferably a fluorescent lighting means, for providing enough illumination of a user face to the camera 11.

A computer pointing device, the track ball 15 in this present embodiment, provides the user the control of the motion of a pointer displayed on the computer screen 13. The function of the track ball 15 is similar to a regular pointing device, called "mouse", used with a personal computer. The user can choose whatever options displayed to the user on the computer screen 13 by gently spinning the track ball 15 until the pointer locates on top of the option the user would like to choose. Then, the user pushes on the select button 16 to choose that option. The select button 16 is a regular push button that closes a circuit when the button is pushed. In general, both the track ball 15 and the select button 16 can be interchangeable with other devices such as an electrostatic touch-pad, which is widely used in notebook computers. In a different embodiment of the present invention, both the track ball 15 and the select button 16 can be totally eliminated by replacing the computer screen 13 with a touch-screen computer monitor, which the user can choose the options displayed on the computer screen by directly touching them. The two small speakers 14 are standard computer speakers with built-in audio amplifiers, and are waterproof.

Figure 3:
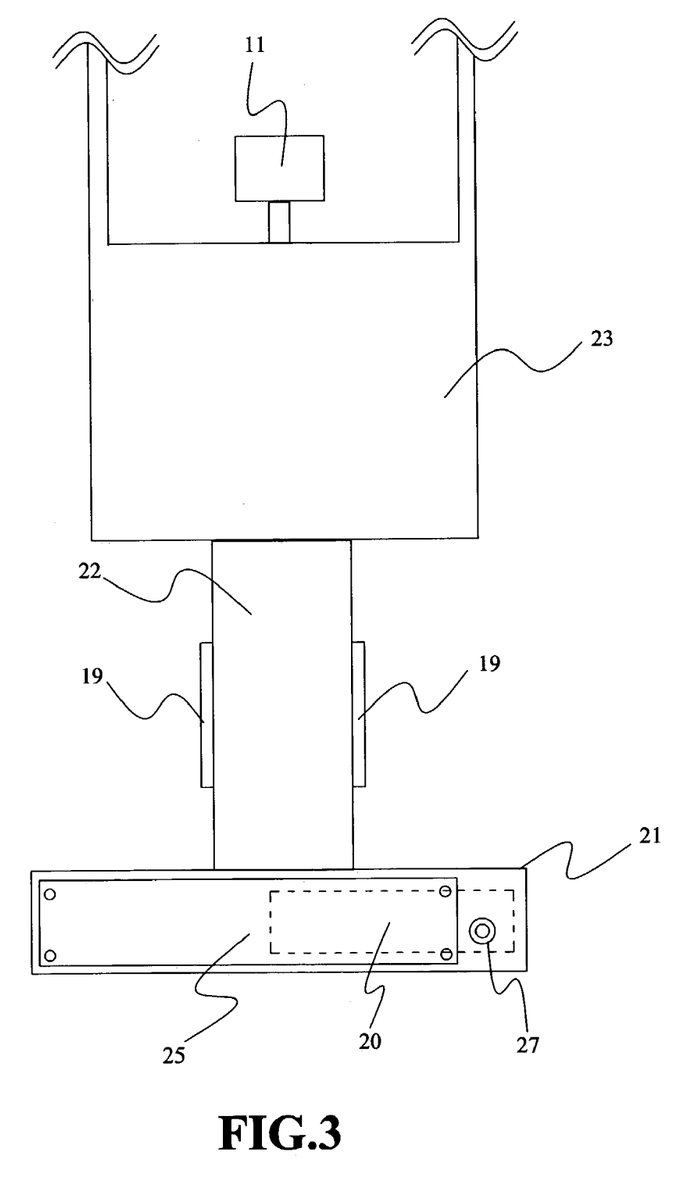
FIG. 3 shows a rear view of the machine.

FIG. 3 shows a rear view of the machine without showing the curtain controller 28 at the top of the figure. A base section lid 25 is used to conceal the computer 20 located inside the base section 21 from unauthorized access from outside. The machine owner or administrator can access the computer 20 through the base section lid 25 to make changes or update the program stored in the hard disc of the computer 20. A power cord entry 27 is a two-centimeter circular hole, which is located to the right of the base section lid 25. The power cord 26 passes the power cord entry 27 into the base section 21, and connects to a power supply of the computer 20. This power supply provides electricity to not only the computer 20 but also the camera 11, the lighting means 12, the computer screen 13, the small speaker 14, the track ball 15, the select button 16, the coin/bill receptor 17, the main speaker 19, the cooling fan 24, and the curtain controller 28, as shown in FIGS. 1 and 2.

Figure 4:
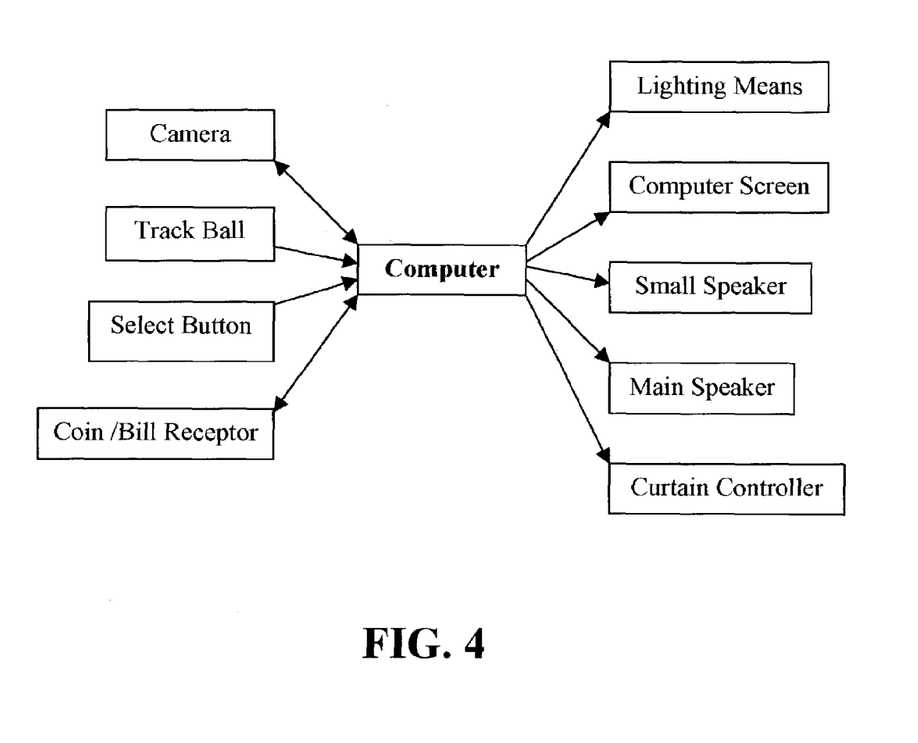
FIG. 4 illustrates a component diagram of the machine.

FIG. 4 illustrates a component diagram of the machine. It shows how each component, which has been previously mentioned in above paragraphs, in the machine connects to each other. It also shows the flow direction of the data between a pair of components which are connected to each other. It is obvious from the diagram that every component is connected to the computer 20. The camera 11 is connected to the computer 20, and provides a single digital image to the computer 20 whenever the camera 11 receives a command from the computer 20. The arrow connecting between the camera 11 and the computer 20 shows the data flow in both directions.

Both the track ball 15 and the select button 16 are also connected to the computer 20, and provide the pointer motion and the user select inputs to the computer 20, respectively. There is only one-way communications between the track ball 15 and the computer 20, which is also true for the select button 16; therefore, the arrow connecting between the track ball 15 and the computer 20 shows the data flow in only one direction, which is toward the computer 20. The coin/bill receptor 17 is also connected to the computer 20. It provides an input to the computer 20 as to how much money has been sensed at the coin/bill receptor 17. Once, the amount of money sensed at the coin/bill receptor 17 is equal to or more than the preprogrammed amount. The computer 20 sends command to the coin/bill receptor 17 to reject all coin or bill that is further put in by the user. If change is needed, the computer 20 instructs the coin/bill receptor 17 to return the change to the user.

The lighting means 12, the computer screen 13, the small speaker 14, the main speaker 19, and the curtain controller 28 are also directly connected to the computer 20. All of them receive commands from the computer 20, but none of them send any input back to the computer 20, which can be clearly seen from the directions of the arrows shown in the figure. The lighting means 12 is turned on or off by the command sent from the computer 20. The computer screen 13 and the small speaker 14 are used by the computer 20 as a means for communicating with the user. The main speaker 19 is mainly used by the computer 20 for advertisement purpose. The curtain controller 28 receives an elevation command from the computer 20, and adjusts the height of the background curtain 18 accordingly.

Figure 5:
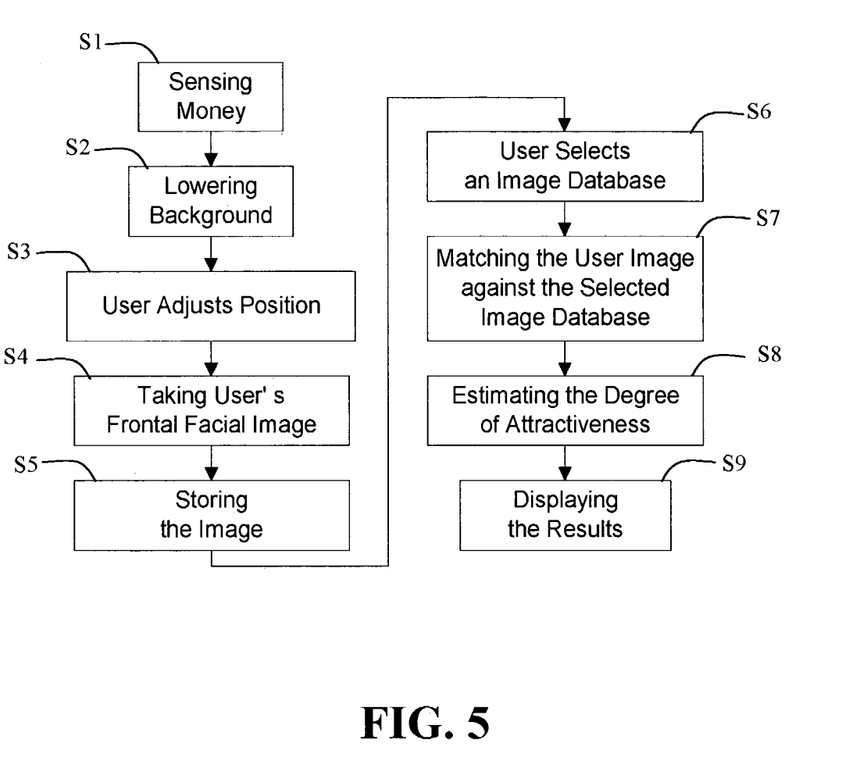
FIG. 5 illustrates a flowchart of the main computer program of the machine.

FIG. 5 illustrates a flowchart of the main computer program controlling the operation of the machine. This computer program resides in the computer 20. The program starts by step S1 senses money at the coin/bill receptor 17. After enough money has been sensed, step S2 instructs the machine to automatically lower the background curtain 18. Next, step S3 directs the user to look straight at the camera 11 by displaying a message on the computer screen 13. When the user is ready, he/she presses the select button 16 to take his/her frontal facial image according to the message on the computer screen 13 issued by step S4. In step S5, the image is temporarily stored in the computer hard disc as a Tagged Image File Format (TIFF).

Before the face matching process begins, step S6 instructs the machine to display a message asking the user to select a category of the existing image databases, e.g., actors, actresses, politicians, singers, sports stars, etc. Once the user has selected the category in step S6, the face recognition or matching program, whose detailed flowchart is shown in FIG. 6, is utilized in step S7 to identify a face in the selected image database yielding the closest match.

Next, in step S8, the geometrical features are input into the degree of attractiveness estimator, which will be discussed in detail later in FIG. 7. The degree of attractiveness estimator is then produced the approximate number indicating the degree of attractiveness. This number can range from 0 to 100, where 100 means very attractive and 0 means very unattractive. Finally, in step S9, the machine displays both results, the most similar celebrity and the degree of attractiveness, on the computer screen 13, and holds the results for one minute. After step S9 is completed, the main program automatically returns to step S1 and the whole processes are repeated all over again.

Figure 6:
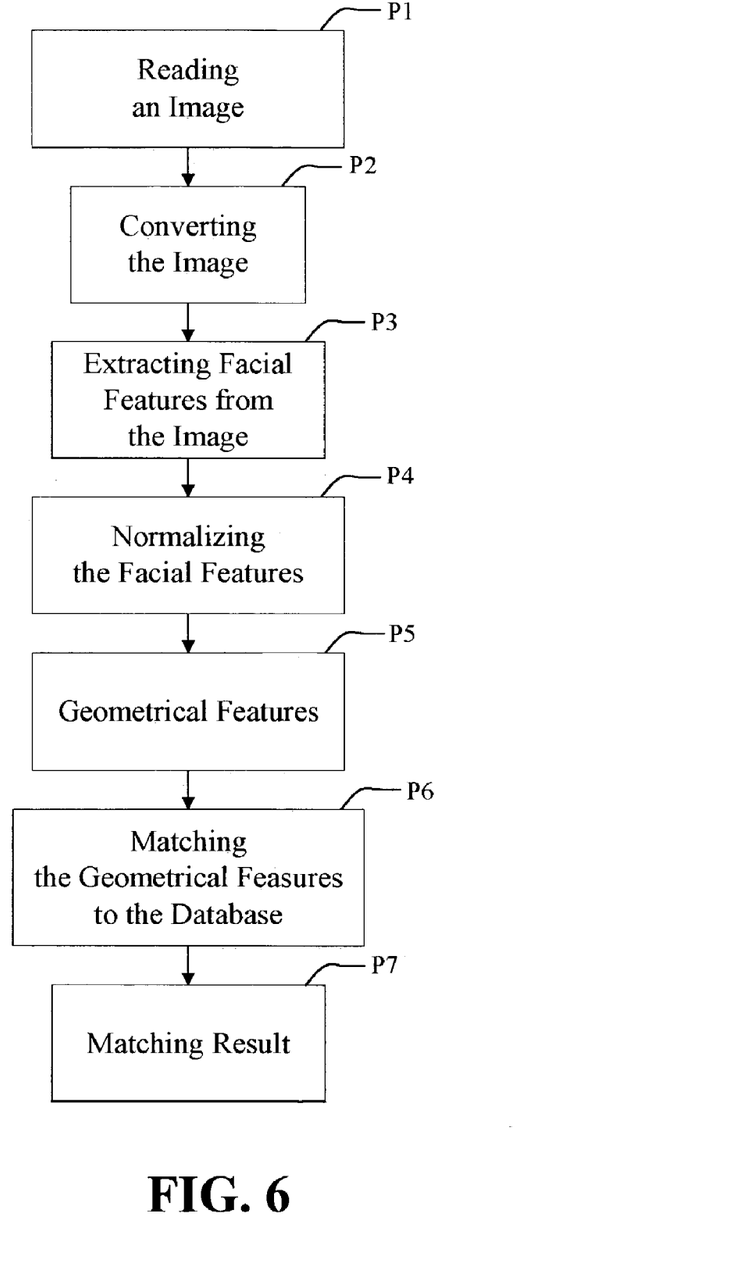
FIG. 6 illustrates a flowchart of the face matching program.

FIG. 6 illustrates a flowchart of the face matching program. First, in process P1, the program reads a user facial image from the computer hard disc, and temporarily stores the user facial image in the computer memory. Next, in process P2, the format of the user facial image is converted from the red-green-blue (RGB) format into the intensity (gray-scale) format. This can be accomplished by assigning the intensity value of each pixel in the intensity image with the average value of the intensity values of the three colors of the corresponding pixel in the RGB image.

Next, in process P3, facial features (such as eyes, nose, mouth, and chin) are automatically extracted from the user facial image in the intensity format. The facial feature extraction method, which is described in the paper titled "Face Recognition: Features versus Templates" by R. Brunelli and T. Poggio in IEEE Transactions on Pattern Analysis and Machine Intelligence, Volume 15, Number 10, October 1993, is used to extract the facial features. In total, thirty-five facial features are extracted from the user facial image. These facial features are basically numbers representing relative positions and sizes of each facial feature in the user facial image.

Next, in process P4, the above thirty-five facial features are normalized by the face width, which is measured at nose position. The normalized facial features now become geometrical features, P5, of the user facial image. These geometrical features, P5, are very important. They are not only used in the following matching process P6, but also used in the following attractiveness rating process, which is discussed in FIG. 7. In process P6, the matching is obtained by computing the Euclidean norms of all vectors originating from the vector of the geometrical features of the user facial image to those of the celebrity facial images previously stored in the computer hard disc. The celebrity facial image corresponding to the smallest Euclidean norm is the closest match, and that celebrity facial image is declared in process P7 to be the most similar face to the user facial image.

Figure 7:
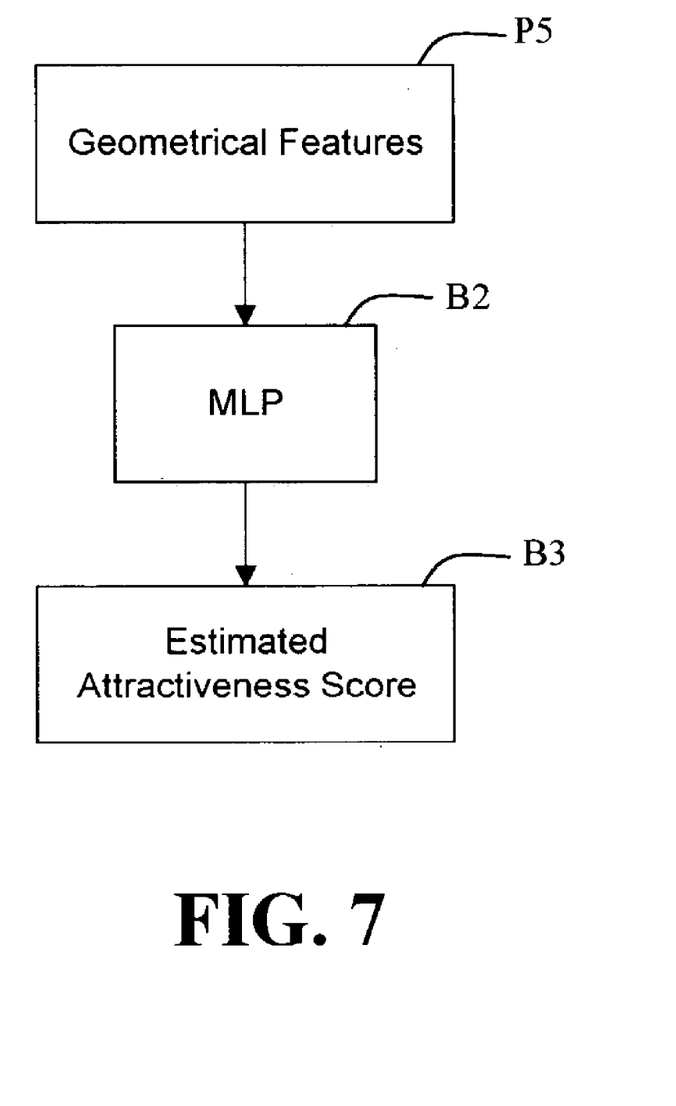
FIG. 7 illustrates a diagram of the degree of attractiveness estimator.

FIG. 7 illustrates a diagram of the degree of attractiveness estimator. The main function of the estimator is to assign a number to each set of geometrical features of a facial image presented to the estimator. The number is then used as an attractiveness measure or an estimated attractiveness score, where a higher number indicates more attractive or desirable than a lower number. The number, however, is only a coarse estimate since qualitative attributes such as attractiveness and goodness in fact are not measurable.

The estimator comprises an artificial neural network, commonly referred to as a Multi-Layer Perceptron (MLP) as indicated in box B2. The MLP used in the present invention has four layers: one input layer, two hidden layers, and one output layer. The four layers are fully connected to form the MLP. The input layer has thirty-five input nodes, which is equal to the number of geometrical features obtained from process P5. Each of the hidden layers has five neurons. The number of neurons in each hidden layer is not fixed, and can be changed independently to improve the accuracy of the estimated attractiveness score produced by the MLP. The output layer has only one output node, which corresponds to the estimated attractiveness score in box B3.

Before the MLP can be used to estimate the attractiveness score, the MLP must be trained by a group of data called a training set. The training set is composed of sets of the geometrical features of facial images of different individuals and corresponding attractive scores assigned to each of the facial images. These scores can be obtained from polls or surveys by asking many people to assign scores to the facial images provided. Each of the geometrical features of the training set is then fed as the input to the MLP at the input layer while the corresponding attractive score is provided to the MLP as the desired output at the output layer. One by one, the MLP learns to produce the desired output from the provided input by systematically changing weights in the neurons in both hidden layers. The learning process of the MLP can be accomplished by using either the conventional back-propagation algorithm or the well-known genetic algorithm. Once the MLP has been well trained to reproduce the correct corresponding attractive score at the output layer whenever there is a set of geometrical features of a facial image presented at the input layer. That MLP can now be used to give an estimated number or score of the degree of attractiveness of any facial image.

Operation

In operation the user stands between the camera 11 and the background curtain 18. After the user inserts enough money into the coin/bill receptor 17, the machine displays a greeting message on the computer screen 13 and sounds a greeting voice through the small speaker 14 while lowers the background curtain 18. Next, the machine turns on the lighting means 12 and directs the user to position his/her head before pressing the select button 16 to take his/her facial image. The machine counts down from 3 to 1 and takes the image. Then, the machine asks the user whether he/she would like to retake the image. If not, the machine proceeds by displaying the categories of celebrities such as movie stars, singers, sports stars, politicians, etc. The user uses the track ball 15 and the select button 16 to choose a celebrity category. After the user has selected the celebrity category, the machine automatically extracts the geometrical features of the user's facial image and compares it to the entire collection images in the category to determine a best match. Then, the machine determines the estimated score of the user's attractiveness. Finally, the machine displays the matching result and the score to the user on the computer screen 13.

Whenever there is no one using the machine for a certain period of time, say five minutes. The machine rolls up the background curtain 18 by using the curtain controller 28, and starts to advertise itself by displaying preprogrammed advertisement video and audio clips on the computer screen 13 and the main speaker 19, respectively. This advertisement keeps going until it is stopped when money is sensed at the coin/bill receptor 17.

Ramifications

The method of estimating the degree of attractiveness of the human face as taught by this invention can be applied as a means for prescreening applicants for job positions in which the applicant appearances play an important role, for example, models, receptionists, and stewardesses.

The method of estimating the degree of attractiveness of the human face as taught by this invention can be also used to determine a perfect face (the face that its geometrical features yields 100 for the attractiveness score). This perfect face can then be used as an outline for creating very appealing human characters in cartoon or animation movies.

What I claim as my invention is:

1. A method of playing a game comprising the steps of:
    obtaining a digital facial image of a user;
    converting the digital facial image into an intensity (gray-scale) format;
    extracting a plurality of facial features from the intensity (gray-scale) format of the digital facial image;
    normalizing the plurality of facial features in relation to at least one of a width of the user's face and a position of the user's nose to provide geometrical features;
    determining a plurality of vectors based upon the user's geometrical features;
    determining Euclidean norms of the plurality of user vectors;
    comparing the Euclidean norms of the plurality of user vectors with Euclidean norms of the plurality of stored celebrity facial images;
    determining which of the plurality of stored celebrity facial images is a closest match to the digital facial image of the user by identifying which stored celebrity facial image has a smallest difference in Euclidean norms when compared to the Euclidean norms of the plurality of user vectors, and
    notifying the user which of a plurality of celebrity facial images the user's digital facial image most closely resembles.

2. A method for playing a game comprising the steps of:
    obtaining a digital facial image of a user;
    dividing a plurality of stored celebrity facial images into a plurality of categories;
    selecting, by a user, one of the plurality of categories of stored celebrity facial images to determine which of the celebrity facial images of the selected group most clearly resembles the digital facial image of the user;
    determining to which of the plurality of stored celebrity facial images the digital facial image of the user most closely corresponds; and
    notifying the user which of the plurality of celebrity facial images the user's digital facial image most closely resembles.

* * * * *